United States Patent [19]
Athanassiadis

[11] 3,966,559
[45] June 29, 1976

[54] APPARATUS FOR DEODORIZING OIL AND SIMILAR MATERIAL

[75] Inventor: Anthony Athanassiadis, Brussels, Belgium

[73] Assignee: Extraction de Smet, Edegem, Belgium

[22] Filed: May 14, 1974

[21] Appl. No.: 469,884

[30] Foreign Application Priority Data
Oct. 31, 1973   Belgium .............................. 806819

[52] U.S. Cl. ............................... 196/111; 196/118; 196/126; 196/127; 196/132; 196/133; 196/136; 55/54; 210/180; 261/77; 159/286; 159/31; 159/43 R; 159/44

[51] Int. Cl.² .................... B01D 1/00; B01D 19/00; B01D 35/18; B01D 1/02

[58] Field of Search ............. 196/46, 111, 118, 126, 196/127, 136; 55/38, 52–54; 210/180; 159/27 A, 27 B; 261/77

[56] References Cited
UNITED STATES PATENTS

| | | | |
|---|---|---|---|
| 407,274 | 7/1889 | Angus | 196/127 |
| 624,527 | 5/1899 | Otto | 261/77 |
| 1,202,823 | 10/1916 | Forward | 196/127 |
| 2,018,778 | 10/1935 | Ebner | 196/126 |
| 3,081,256 | 3/1963 | Hendal et al. | 196/118 |
| 3,129,076 | 4/1964 | De Smet | 261/77 |
| 3,365,860 | 1/1968 | Boris | 261/77 |

*Primary Examiner*—Jack Sofer
*Attorney, Agent, or Firm*—Wenderoth, Lind & Ponack

[57] ABSTRACT

In a deodorizing apparatus, at least the lower part of a column is surrounded at least partly by compartments which are not connected together, each compartment having means for supplying treatment fluid and means for discharging the treated material with separate control but opening into a common duct. The duct for discharging the treated material from the central column is divided into separate ducts the outlets of which open into the compartments and which are provided with separately-controlled means for carrying the material to the respective compartments.

12 Claims, 7 Drawing Figures

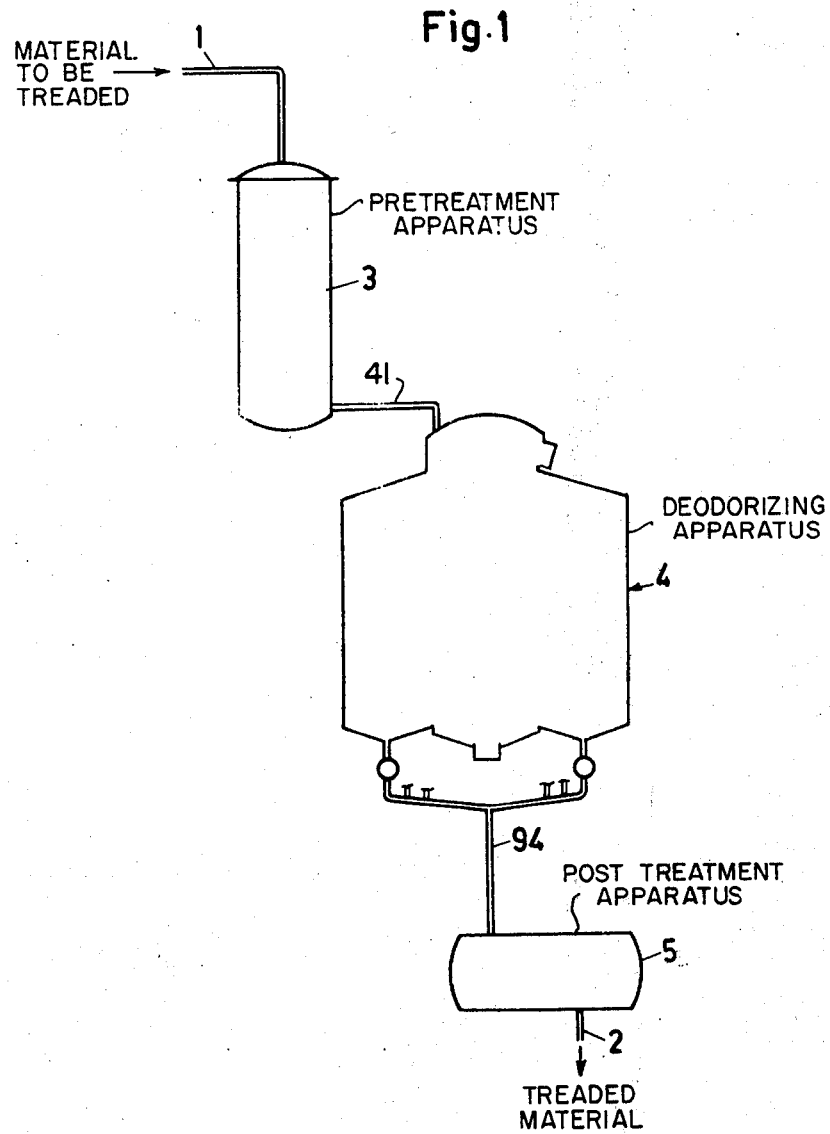

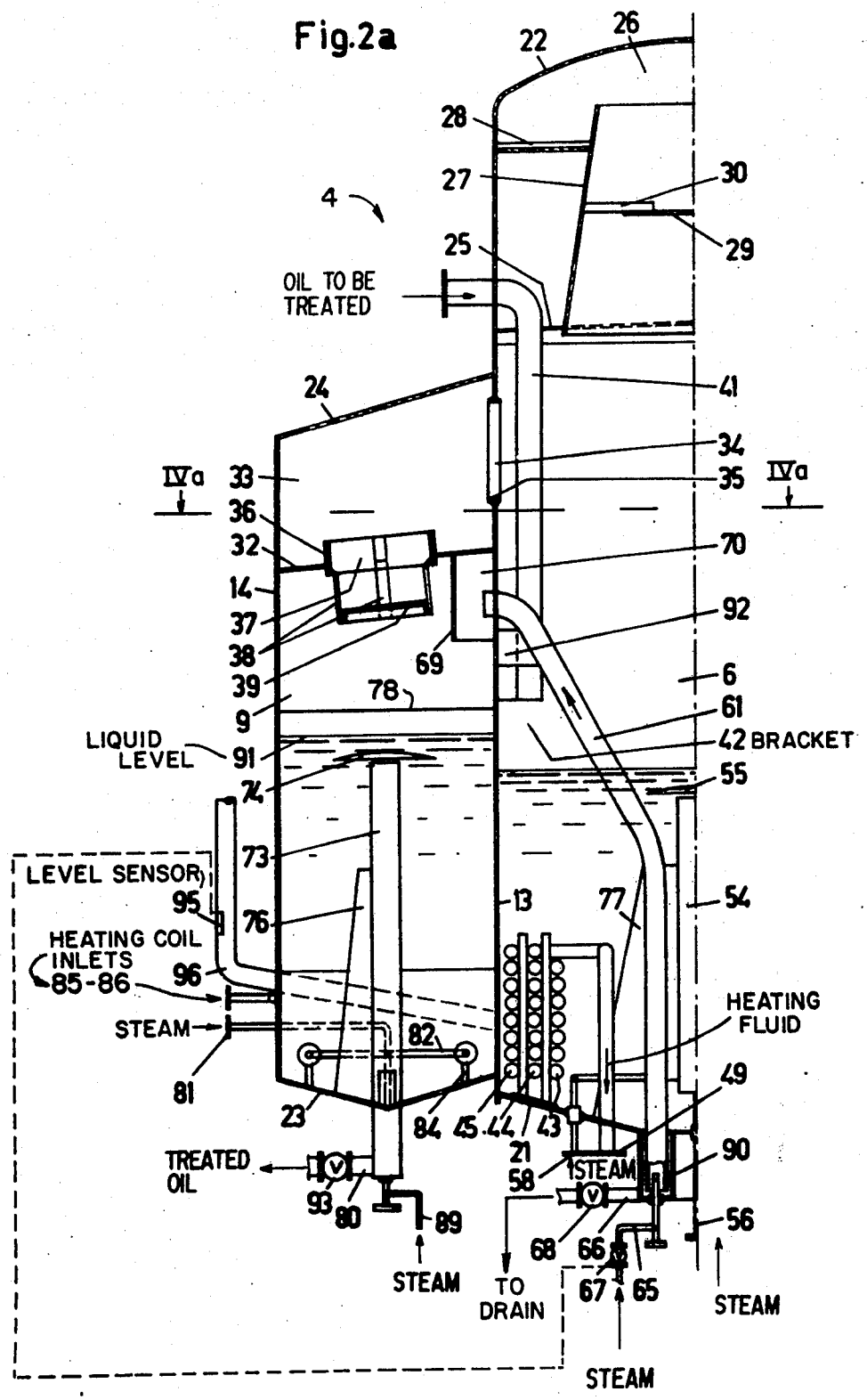

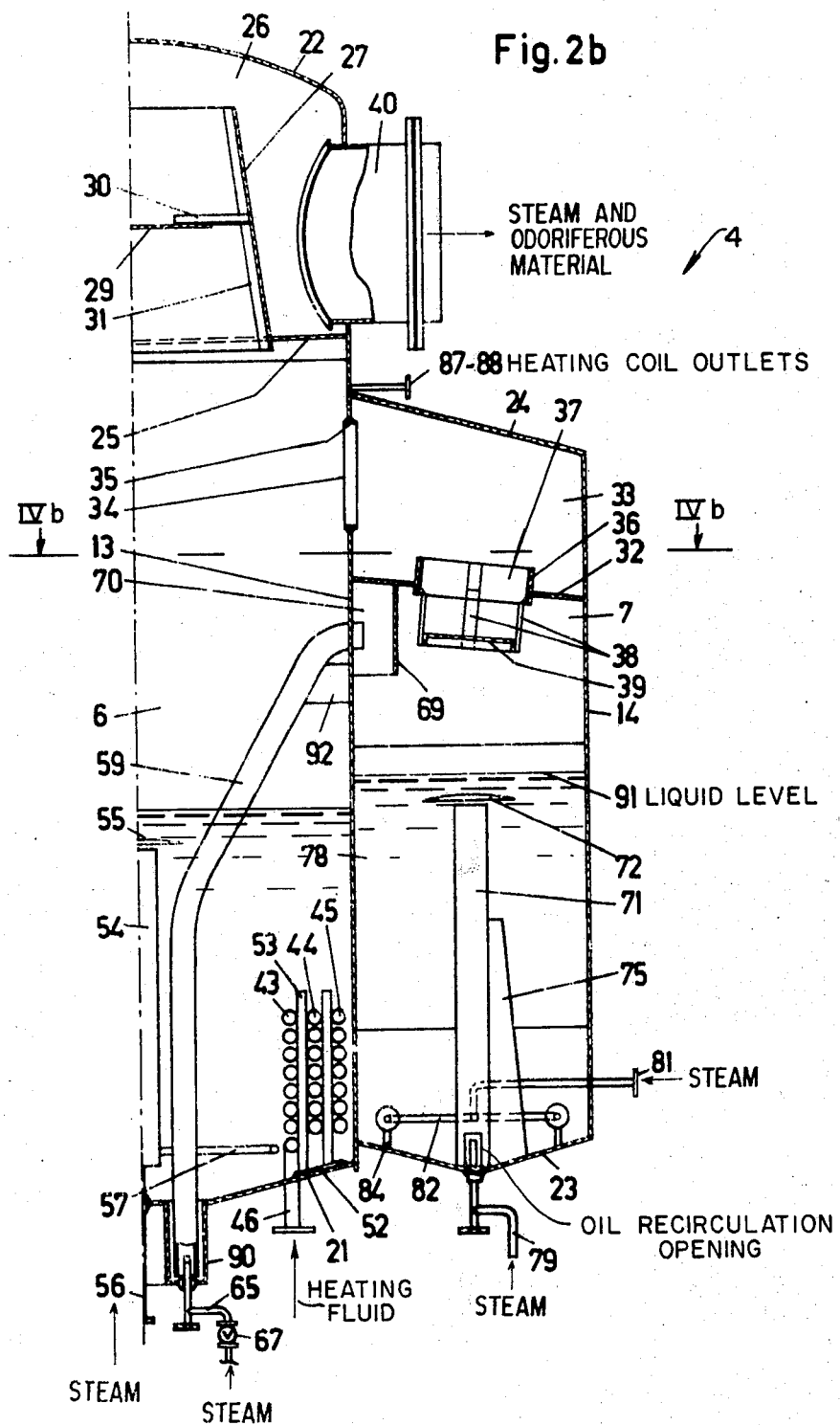

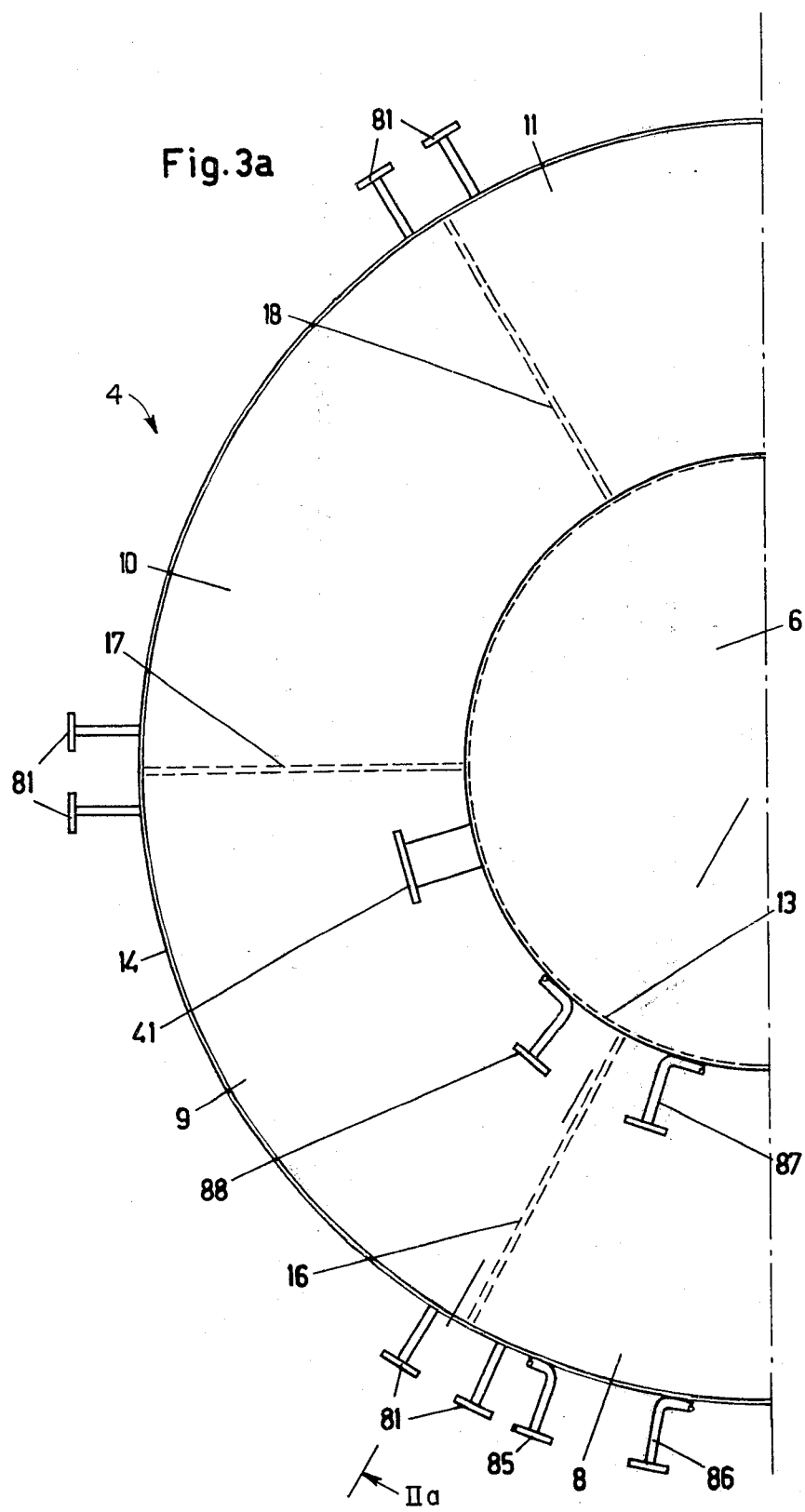

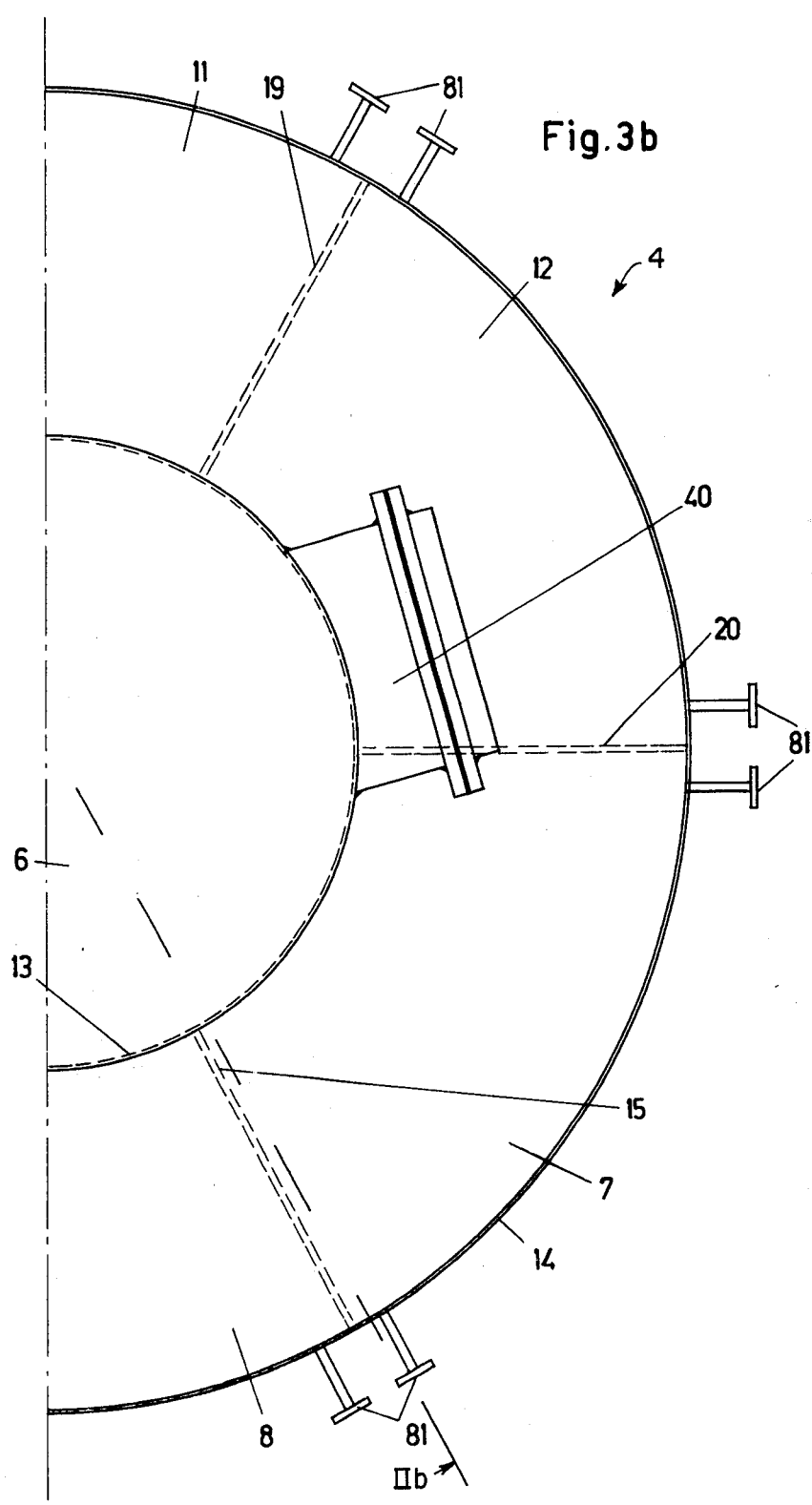

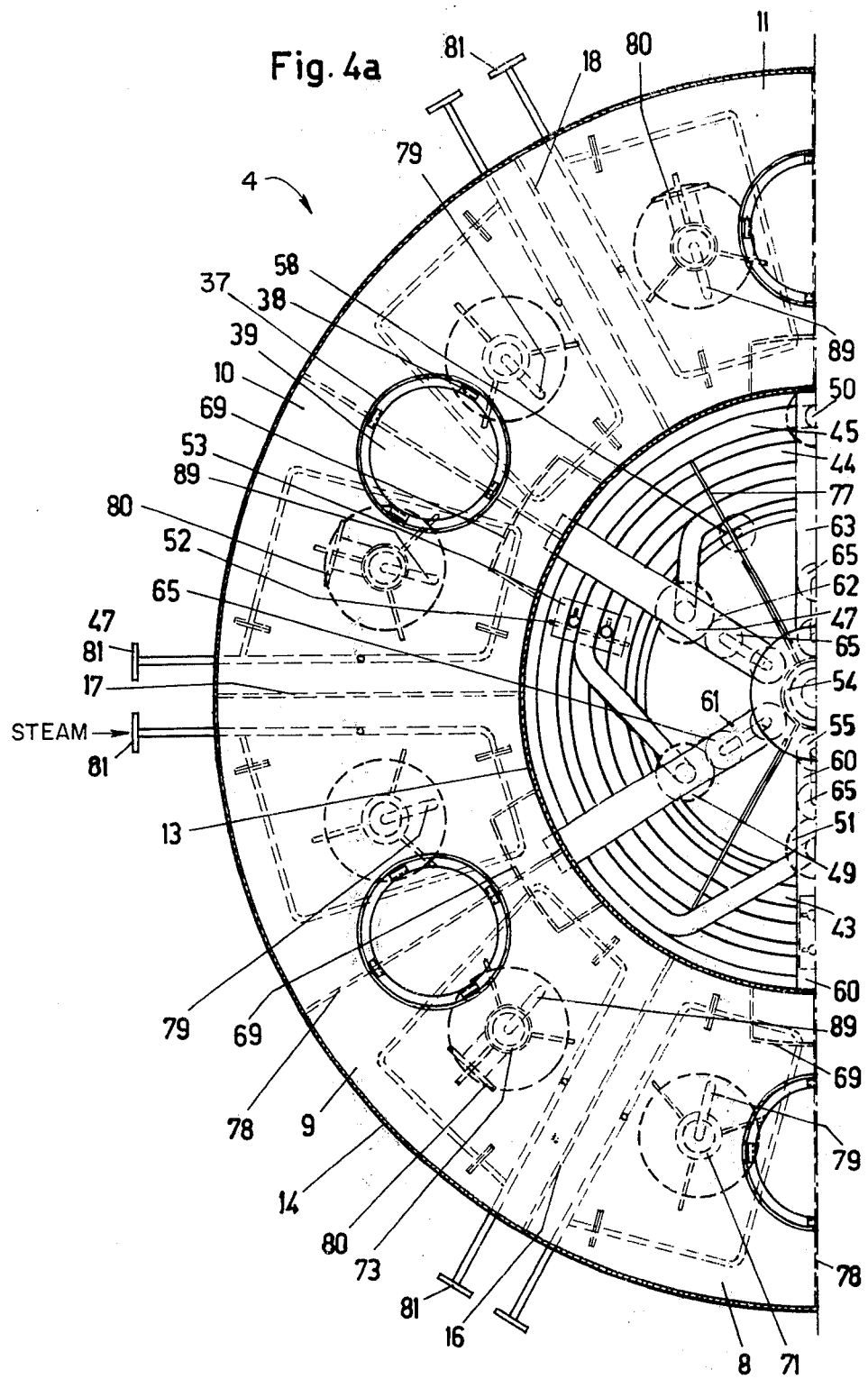

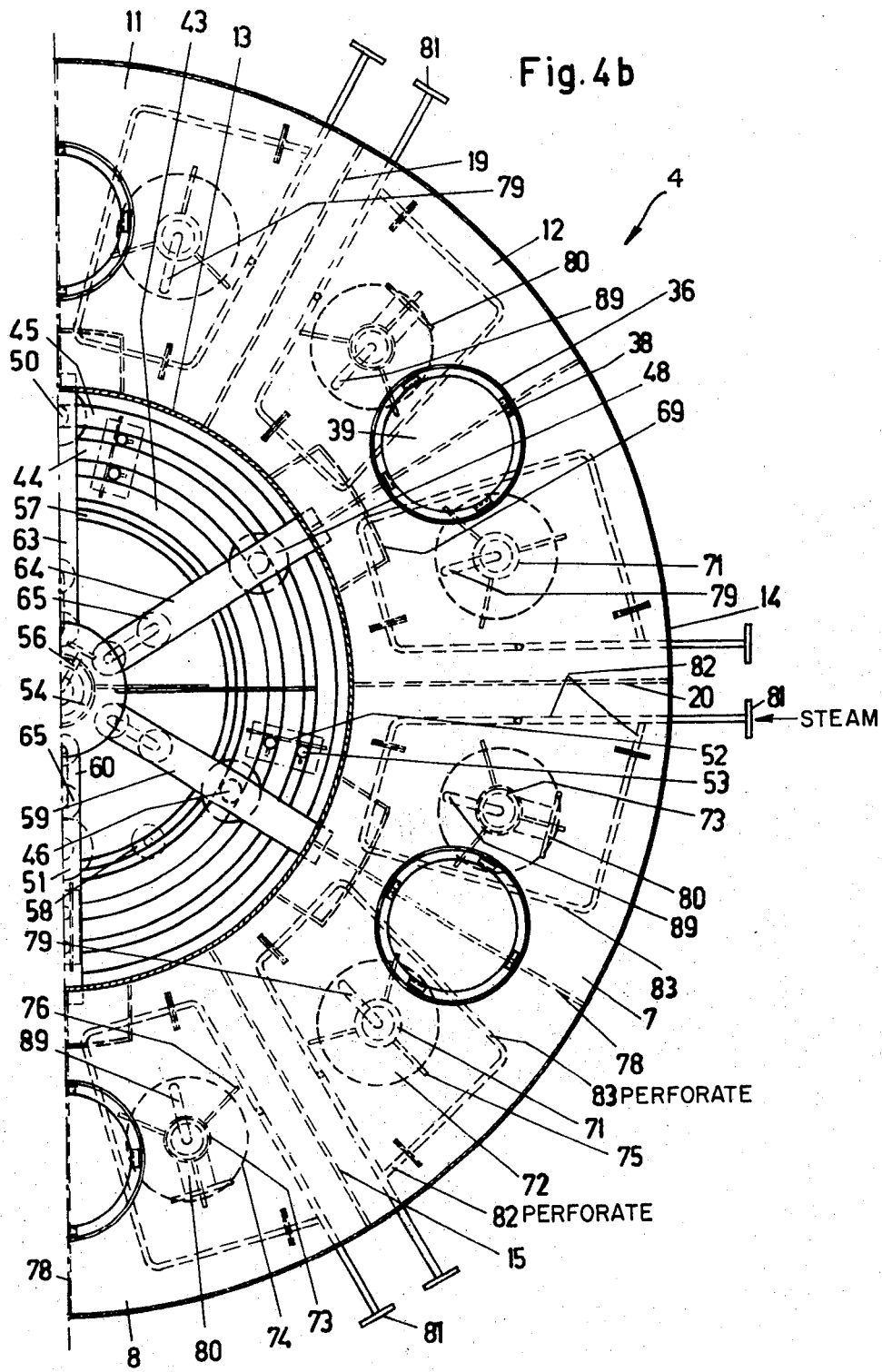

APPARATUS FOR DEODORIZING OIL AND SIMILAR MATERIAL

BACKGROUND OF THE INVENTION

This invention relates to an apparatus for deodorizing oil and similar material and comprises a column, an inlet duct for the material to be treated which opens in an upper part of the column, means for supplying a treatment fluid to a lower part of the column, a gas discharge tube in the top part of the column to be connected to an exhaust device, and an outlet duct for the treated material.

There are deodorizing apparatus which treat oil continuously and which are generally part of a more sophisticated installation. Such an apparatus is normally preceded by an equipment for performing other treatments, notably heating and deacrating, and it is normally followed by an apparatus which is used for further treatments, notably for cooling and finishing.

An installation comprised of a set of such apparatus and of a continuous-working deodorizing apparatus, performs a complete continuous treatment. However, the continuous operation in the deodorizing apparatus has the drawback that oil particles can escape an efficient treatment in the apparatus, no matter what dispositions are taken to avoid a particle escaping the treatment.

As even a minute percentage of untreated particles is enough to make the oil unfit, the continuous-working deodorizing apparatus must include complex means which should normally insure a complete treatment of the oil with all the particles thereof. Such complex means do however make the operation of the apparatus less easy and do away with the flexibility required of the installation for the changing of the material to be treated.

Those deodorizing apparatus which do not operate continuously are of simpler construction and insure a treatment of all the particles, but they cut-off or interrupt the continuous flow of the material through the over-all installations of which they are part.

SUMMARY OF THE INVENTION

The primary object of the invention is thus to provide an apparatus that works continuously as regards the material feeding from the upstream equipment and the material discharge towards the downstream equipment, but which treats individual quantities of oil or similar material in a concontinuous manner.

For this purpose, at least the lower part of the column is surrounded at least partly by compartments which are not connected together, each of the compartments having means for supplying treatment fluid and means for discharging the treated material with separate control but opening into a common duct, the duct for discharging the treated material from the central column being divided into separate ducts the outlets of which open into the respective compartments and which are provided with separately-controlled means for carrying the material to the respective compartment.

It is to be noted that from Belgian patent No. 587,534, there is known an apparatus comprising a central column the lower part of which opens inside a circumferential compartment which is part of a series of six circumferential compartments that surround the column bottom.

In such known apparatus, the compartments are connected together, and the oil passes from the column through the six compartments towards the discharge duct. This known apparatus thus performs the oil treatment with a continuous flow.

In such known apparatus, the six compartments are thus arranged in series as regards the oil flow, while in the apparatus according to the invention, the compartments are arranged in parallel and inside the compartments oil portions are treated separately.

In an advantageous embodiment of the invention, the separate ducts open inside the compartment top portions and the inlet end of each separate duct is located at the column bottom, the separately-controlled means for carrying the treated material towards the compartments comprising a fluid injector that opens inside the inlet ends of the separate ducts.

In a particular embodiment of the invention, the separate compartment top portions are connected to the top part of the column through a passageway which comprises at least one baffle plate.

Preferably such passageway comprises a single enclosure which is connected on the one hand to the top part of the column through openings and on the other hand to each separate compartment through a separate opening.

In a preferred embodiment of the invention, the apparatus comprises heating means adjacent that column wall which is common to the compartments.

In a more particular embodiment of the invention, the unit formed by the compartments is surrounded by heating means.

BRIEF DESCRIPTION OF THE INVENTION

Other details and features of the invention will be apparent from the description given below by way of non limitative example and with reference to the accompanying drawings, in which:

FIG. 1 is a general diagram of an installation for deodorizing oil or similar materials, a part of which is comprised of the apparatus according to the invention.

FIG. 2, divided into FIGS. 2a and 2b, is an elevation view, taken substantially along lines IIa–IIb of FIGS. 3a and 3b, of the apparatus for deodorizing oil or similar material according to the invention, which is part of the installation shown in FIG. 1.

FIG. 3, divided into FIGS. 3a and 3b, is a plan view on a larger scale of the apparatus of FIG. 2, showing essentially the elements located in the upper portion of the apparatus.

FIG. 4, divided into FIGS. 4a and 4b, is a plan view, taken substantially along lines IVa–IVb of FIGS. 2a and 2b, on the same scale as FIG. 3 of the apparatus of FIGS. 2 and 3, but showing essentially the elements located in the lower portion of the apparatus.

DETAILED DESCRIPTION OF THE INVENTION

In the various figures the same reference numerals pertain to similar elements.

The installation shown in FIG. 1 treats oil or a similar material between an inlet duct 1 and an outlet duct 2. The description hereinbelow will only make reference to oil but it must be understood that some other material could be treated in the same way.

To the installation is continuously supplied oil through the duct 1 which opens into an apparatus which is shown diagrammatically at 3. Apparatus 3 is used for example for pre-heating and deacrating the oil, and leads to the deodorizing apparatus generally shown at 4 and, which is the object of the present invention. Apparatus 4 thus receives the oil which has been continuously pre-treated. The oil after being deodorized in the apparatus 4 is fed to a downstream equipment 5 which is used for example for cooling and which notably comprises a buffer tank. Equipment 5 continuously feeds the treated oil to the outlet duct 2.

The apparatus according to the invention as shown in detail in FIGS. 2 to 4, essentially comprises a central column 6 and six circumferential compartments 7 to 12 which surround the central column 6.

Central column 6 is bounded by a bottom 21, a cover-forming dome 22 and a central sleeve 13 that comprises a wall common to the central column 6 and to the circumferential compartments 7 to 12.

Circumferential compartments 7 to 12 are bounded by central sleeve 13, an outer sleeve 14, a bottom 23, a plate 32 that forms an intermediate roof and partition walls 15 to 20 between the compartments 7 to 12.

Partition walls 15 to 20 engage the bottom 23 as well as the plate 32 forming an intermediate roof. The walls thus comprise a tight partition between the various compartments, in such a way that the oil from one compartment cannot flow towards the adjoining compartments in the same way as the gases cannot escape from one compartment to another but can only leave the compartments through openings 37 which will be described hereinbelow.

Inside the column 6 is attached a partition plate 25 between the column proper and the enclosure 26 that comprises that column portion located above plate 25. Plate 25 follows the shape of sleeve 13 but in the center thereof is provided a hole inside which is made fast with the lower part thereof a frusto-conical baffle plate 27. Three angle-irons 28 one of which is shown in FIG. 2, complete the mounting of baffle plate 27 inside the upper portion of the column 6. Inside the frusto-conical baffle plate 27 is made fast through three angle-irons 30, a plate 29. The diameter of plate 29 which also forms a baffle plate, is smaller than the diameter of the cone frustum where plate 29 is made fast. The cone frustum thus being open both at the bottom and at the top, the gases which escape from the column lower portion can pass through the cone frustum between the inner wall thereof and the plate 29. Such gases thus reach the enclosure 26 from which they can be discharged through a connecting tube 40 by means of which enclosure 26 is connected to a gas exhaust device not shown.

The frusto-conical baffle plate 27 is reinforced inwardly with angle-irons 31 which extend along generating lines of the cone. The angle-irons 30 for the mounting of plate 29 are also made fast to angle-irons 31.

Above the compartments 7 to 12 is further provided a single enclosure 33 which is bounded by the sleeves 13 and 14, at the bottom by the plate 32 forming an intermediate roof and at the top by the dome or roof 24. Single enclosure 33 communicates with that portion of column 6 located below the plate 25 through six openings 34 the edges of which are reinforced with rings 35. Above each one of the compartments 7 to 12, an opening 37 is provided in the plate 32 forming an intermediate roof. The edge of each opening 37 is reinforced with an upstanding ring 36. A plate 39 with downturned rim is made fast to ring 36 through four battens 38.

The openings 34 through which the single enclosure 33 communicates with the upper portion of the column 6 and the openings 37 through which the compartments 7 to 12 communicate with single enclosure 33 are located in the same radial planes of column 6. The gases can escape from each one of compartments 7 to 12 towards the enclosure 33 between the battens 38 and through the opening 37. The plates 39 are thus baffle plates inside the compartments 7–12, just as the plates 25 and 27 and the plate 29 comprise baffle plates inside the column 6.

The gases coming out of the compartments 7–12 which enter the enclosure 33 leave the same through the connecting openings 34 to be finally discharged through the connecting tube 40 after first passing through the inner space of the cone frustum bounded by baffle plate 27 and the enclosure 26.

Even though the enclosure 33 is single and thus comprises the receiving space for the gases from each one of the compartments 7–12, there still occurs a preferred flow from a compartment through an opening 37 provided in the upper portion of such compartment and therefrom towards the opening 34 which is crossed by the same radial plane as such opening 37.

The oil to be treated can be fed to the column 6 through the inlet duct 41 which is bent and has a horizontal portion that passes through the cylindrical wall of the dome 22 forming a cover and a vertical portion depending in the column 6 and passing through the plate 25. In the lower portion thereof, the duct 41 is made fast to the inner sleeve 13 by means of a bracket 42.

Adjacent the lower portion of the casing 13 that comprises the wall common to the column 6 and the compartments 7 to 12 is mounted a heating means comprised of three concentric coils 43 to 45 the inlet pipes of which have been indicated in 46, 48 and 50 (see FIG. 4b) and the outlet pipes of which have been indicated in 47, 49 and 51 (see FIG. 4a).

The coils are soldered to four pairs of rods 53 that bear on the central column bottom 21 through flat parts 52. Each pair of rods 53 is provided with a single flat part 52. One rod from each pair lies between the inner coil 43 and the middle coil 44, while the other rod lies between the middle coil 44 and the outer coil 45, as shown in FIGS. 4a and 4b.

The inlet pipes 46, 48 and 50 and the outlet pipes 47, 49 and 51 pass through the bottom 21 of the central column 6 as shown in the FIG. 2b for the inlet pipe 46 of the inner coil 43 in FIG. 2a and for the outlet pipe 49 of the middle coil 44.

The coils are of course connected through the inlet and outlet pipes thereof in the circuits of a fluid which is heated in some other location. Such fluid is for instance steam.

It is to be noted that the coils 43, 44 and 45 comprising heating means are located adjacent the inner sleeve 13, thus adjacent a wall which is common to the compartments 7 to 12.

To deodorize the oil, the oil is brought into intimate contact with a heat injection fluid such as steam. Such contacting is performed partly inside the central column and partly inside the compartments 7 to 12.

Steam is supplied to the column bottom through an injector 56 which, as shown in FIGS. 2a and 2b, opens in the lower portion of a central pipe 54 which is provided with a cap 55. Due to the injection of steam through the injector 56 which opens below the oil level, oil is carried along with the steam through the pipe 54, it is projected against the cap 55 and flows down into the column 6. There is thus formed a strong oil flow with an intimate contact between the oil and steam.

Steam is also introduced into the oil in column 6 through the distributing circuit 57 (see FIG. 2b) comprised of a perforated ring pipe. Two steam-supply pipes 58, shown in FIGS. 2a, 4a and 4b, supply the distributing circuit.

That oil introduced inside the column 6 through the duct 41, heated therein by the coils 43, 44 and 45 and contacted with the steam supplied by the injector 56 and the distributing circuit 57, is discharged from the column through feeding pipes 59 to 64 towards the compartments 7 to 12. Each one of feeding pipes 59 to 64 leads to one of the compartments 7 to 12 as shown in FIGS. 4a and 4b. The outlet of each of the ducts 59 to 64 thus opens in one compartment 7 to 12. The receiving end of each carrying duct 59 to 64 lies in a common ring portion 90 projecting downwards relative to the column bottom 21, as shown in FIGS. 2a and 2b. In the receiving end of each of the ducts 59 to 64 opens a steam injector 65 which is controlled by a valve 67. When a valve 67 is open steam is injected in the respective duct and oil is thus propelled through the duct. The sequence according to which the valves are normally opened will be described hereinbelow.

The downwardly-projecting ring portion 90 is completed by a drain tube 66 provided with a valve 68 which is normally closed and which is only opened for draining the apparatus when the installation of which the apparatus is part has to be used for treating another kind of oil.

All of the attachment parts have not been shown. Besides the parts mentioned above, plates 77 for attaching the pipe 54 relative to the column bottom 21 and flat parts 92 for attaching the ducts 59 to 64 relative to the sleeve 13 have been shown.

Inside each one of the compartments 7 to 12 against the lower side of the intermediate roof-forming plate 32 is attached an U-shaped plate 69 which joins with both vertical edges thereof the outer surface of the sleeve 13 on either side of the location where one of the pipes 59 to 64 opens into the respective compartment. Plate 69 thus bounds inside the compartment a small compartment 70 opening downwards. The oil flowing out of the duct is projected against plate 69 and falls into the compartment on either side of a plate 78 which, as shown in FIGS. 4a and 4b divides the compartment into two sub-compartments. Inside each one of the sub-compartments is mounted a pipe which bears reference numeral 71 for the one sub-compartment and reference numeral 73 for the other sub-compartment. The pipe 71 is provided with a cap 72 and it is made fast relative to bottom 23 by means of three plates 75. In the same way, the pipe 73 is provided with a cap 74 and it is made fast relative to the compartment bottom 23 by means of three plates 76.

A steam injector 79 opens inside the lower portion of pipe 71. Injector 79 is normally supplied with steam which carries along the oil and thus causes oil to flow in a closed circuit, as well as the oil to be mixed with such steam. In the same way, a steam injector 89 opens inside the lower portion of pipe 73, to carry the oil along and to cause the oil to flow inside the compartment and to contact intimately the carrying steam.

Each one of the 12 sub-compartments is also provided with a steam-distributing circuit. Each one of such circuits is supplied with steam through a steam supply pipe 81. The pipes 81 are bent with a horizontal portion passing through the outer casing 14 and a vertical portion directed downwards and connected to a pipe 82 in the center thereof. Pipe 82 extends substantially horizontally and it is connected with its ends to the ends of a pipe 83 which also extends horizontally. The pipes 82 and 83 are, as shown in FIGS. 4a and 4b of a U-shape and thus form together a closed circuit. The pipes are perforated and thus introduce steam into the oil when steam is supplied thereto through the supply pipe 81. Pipes 82 and 83 bear with lugs 84 on the compartment bottom 23.

Both sub-compartments of each compartment 7 to 12 thus comprise steam-introducing means comprised of an injector 79 or 89 opening into a pipe 71 or 73 and of a distributing circuit 82–83 supplied through a steam inlet pipe 81.

The one sub-compartment in each compartment 7 to 12 also has an outlet tube 80 which is integral with the lower portion of tube 73 which extends below the compartment bottom 23. Tube 80 is completed by a valve 93 the opening and closing sequence of which will be further described hereinbelow. The tubes 80 extend beyond the valves 93 to be merged in a single tube 94 (see FIG. 1) which opens into the equipment located downstream from the apparatus shown in FIGS. 2 to 4.

The outer sleeve 14 is provided on the outer surface thereof, with two outer heating coils from which only the inlet pipes 85 and 86 and the outlet pipes 87 and 88 have been shown. The outer coils thus surround the complete unit formed by the compartments 7 to 12.

Oil is continuously fed to the apparatus through the inlet duct 41 from the apparatus 3 located upstream from the apparatus 4. The oil is first treated in the column 6 by introducing steam through the injector 56 and the inlet pipes 58 leading to the circuit 57.

When the apparatus operates, the compartments 7 and 12 are also filled with oil up to a level the upper limit of which is shown in 91.

Every 20 minutes, one valve 93 of an outlet tube 80 from one of the compartments 7 to 12 is opened for 5 minutes. One complete operating cycle has consequently a duration of 2 hours, that is 6 times 20 minutes. Thus at some determined time, the valve 93 of the outlet tube 80 from compartment 7 is opened for 5 minutes, and twenty minutes later, also for a duration of 5 minutes, the corresponding valve 93 of compartment 8 is opened and so on. Each compartment 7 to 12 is thus drained off once in every 2-hour cycle.

Half a minute after closing the valve 93, the valve 67 of the injector 65 in the inlet duct leading to the drained compartment is opened. The compartment which has just been drained is thus filled with oil again.

For example, half a minute after closing the valve 93 of the outlet tube 80 from compartment 7, the valve 67 of the steam injector 65 of that duct 59 leading to compartment 7 is opened.

Valve 67 is then closed either 5 minutes later or before the end of these 5 minutes under the action of a level sensor 95 which closes the opened valve 67 should the level inside column 6 drop below the sensor.

Sensor 95 is arranged inside a tube 96 which communicates with column 6. The sensor lies level with the upper portion of the concentric coils 43, 44 and 45. The coils are thus always within the oil, which prevents overheating thereof, which could cause a deterioration.

By opening the valve 67 controlling the steam injection in a duct supplying oil to a compartment, such compartment is thus filled. Inside such compartment, the oil is treated for a duration of two hours less a few minutes which are required for draining and filling the compartment. It is to be noticed that all of the compartments are drained in sequence into one and the same duct 94 leading to the equipment 5 downstream of the apparatus shown in FIGS. 2 to 4.

In the separate compartments 7 to 12, the oil is treated with steam supplied through the injectors 79 and 89, as well as through the inlet pipes 81.

The steam injectors 79 and 89 go on working and the steam-supply pipes 81 remain open during the draining and filling of the compartment concerned. An upward stream flow is thus maintained inside the compartment, which prevents gases from other compartments entering from enclosure 33 that compartment subjected to the draining or filling operation.

It is clear that all of the valves can be controlled by a single programmer, as is usual in an apparatus of this kind.

Each one of the compartments 7 to 12 thus comprises discharge means for the treated material, that is tube 80, which is separately controlled by the valve 93 and opens inside a common duct 94. The treated-material discharge duct in the central column 6 is thus divided into separate ducts 59 to 64, the outlets of which open into the compartments 7 to 12 and which are provided with a separately-controlled means for carrying the material to the compartment, such means comprising the steam injector 65 and the valve 67 thereof.

Inside each one of the compartments 7 to 12, different batches of oil are treated separately for a duration of 2 hours less a few minutes. The treatment inside compartments 7 to 12 is thus a discontinuous treatment as each compartment is discharged and filled approximately every 2 hours. Such duration is long enough to insure complete treatment of an oil already pretreated inside column 6 and inside the apparatus 3 preceding the appratus 4 according to the invention.

An advantage of the apparatus according to the invention in that an intensive deodorizing occurs by the high-speed carrying along of the oil with the steam through the separate ducts 59 to 64 from the central column 6 towards the separate compartments 7 to 12. The deodorizing started inside column 6 goes on by the carrying along through the ducts before ending inside the compartments.

Another advantage of the apparatus lies in that the draining of the column 6 for changing the oil to be treated can be made by means of the injectors 65 through the ducts 59 to 64 towards the compartments 7 to 12.

It must be understood that the invention is in no way limited to the above embodiments and that many changes can be brought therein without departing from the scope of the invention as defined by the appended claims.

I claim:

1. In an apparatus for deodorizing oil and similar material, said apparatus being of the type including:
 a column; inlet duct means opening into an upper part of said column for supplying thereto material to be treated;
 means for supplying heat injection fluid to a lower part of said column to treat said material therein; and
 a gas discharge tube in said upper part of said column and adapted to be attached to an exhaust device;
 the improvement comprising:
 a plurality of separate compartments surrounding at least a portion of said lower part of said column, said compartments being separate from, and not in fluid communication with, each other;
 a plurality of first duct means, one each extending from the lowest portion of said column to one of said compartments, for allowing passage of material from said column separately to each of said compartments;
 a plurality of separately controlled supply means, one each operatively associated with one of said first duct means, for supplying said material from said column through the respective said first duct means to the respective compartment;
 means for supplying heat injection fluid to each of said compartments to treat said material therein;
 vapor passageway means communicating the top portion of said compartments with said upper part of said column;
 a plurality of second duct means, one each leading from a respective one of said compartments, for discharging treated material from each of said compartments to a common outlet duct connected to each of said second duct means; and
 a plurality of separate control means, one each connected to one of said second duct means, for separately controlling the flow of treated material through the respective said second duct means from the respective said compartment.

2. An apparatus as claimed in claim 1, wherein said means for supplying heat injection fluid to each of said compartments comprises separate supply means for each said compartment.

3. An apparatus as claimed in claim 1, wherein each of said first duct means has a inlet end positioned adjacent the bottom of said column and a outlet end opening into an upper portion of the respective said compartment; and each of said supply means comprises a fluid injector opening into the respective said inlet end of the respective said first duct means.

4. An apparatus as claimed in claim 1, wherein said vapor passageway means includes at least one baffle plate for communicating the top portions of each of said compartments with said upper part of said column.

5. An apparatus as claimed in claim 4, wherein said vapor passageway means further comprises a single enclosure surrounding said column above said compartments; first openings connecting said enclosure with said compartments; and second openings connecting said enclosure with said upper part of said column.

6. An apparatus as claimed in claim 5, wherein said first openings comprise a plurality of openings, one each between said enclosure and one of said compartments; said second openings comprise a plurality of openings equal in number to said plurality of first openings and one each being in the same radial plane as a respective of said first openings.

7. An apparatus as claimed in claim 6, wherein each of said first openings has a baffle plate positioned therebelow.

8. An apparatus as claimed in claim 7, further comprising a baffle plate positioned in said upper part of said column between said second openings and said gas discharge tube.

9. An apparatus as claimed in claim 1, wherein each of said compartments is divided over a portion of the height thereof into two sub-compartments by a substantially vertical radial plate having a lower edge positioned above the bottom of the respective compartment.

10. An apparatus as claimed in claim 9, wherein each of said first duct means has an oulet end opening into the respective said compartment at a position above the respective said substantially vertical radial plate.

11. An apparatus as claimed in claim 10, wherein said means for supplying heat injection fluid to each of said compartments comprises a treatment fluid circuit positioned in each of said sub-compartments.

12. An apparatus as claimed in claim 11, wherein said control means for each said compartment is positioned within one only of said sub-compartments of said compartment.

* * * * *